US009860239B2

(12) United States Patent
Stubblefield

(10) Patent No.: US 9,860,239 B2
(45) Date of Patent: *Jan. 2, 2018

(54) SYSTEM AND METHOD FOR UTILIZING BEHAVIORAL CHARACTERISTICS IN AUTHENTICATION AND FRAUD PREVENTION

(71) Applicant: TeleSign Corporation, Marina del Rey, CA (US)

(72) Inventor: Stacy Lyn Stubblefield, Los Angeles, CA (US)

(73) Assignee: TeleSign Corporation, Marina del Rey, CA (US)

(*) Notice: Subject to any disclaimer, the term of this patent is extended or adjusted under 35 U.S.C. 154(b) by 118 days.

This patent is subject to a terminal disclaimer.

(21) Appl. No.: 15/056,768

(22) Filed: Feb. 29, 2016

(65) Prior Publication Data
US 2016/0285855 A1 Sep. 29, 2016

Related U.S. Application Data

(63) Continuation of application No. 13/844,417, filed on Mar. 15, 2013, now Pat. No. 9,275,211.

(51) Int. Cl.
*G06F 7/04* (2006.01)
*H04L 29/06* (2006.01)
*G06F 21/31* (2013.01)

(52) U.S. Cl.
CPC .......... *H04L 63/083* (2013.01); *G06F 21/313* (2013.01); *G06F 21/316* (2013.01); *H04L 63/0853* (2013.01); *H04L 63/102* (2013.01); *H04L 63/1433* (2013.01); *H04L 63/18* (2013.01); *H04L 63/20* (2013.01); *H04L 2463/082* (2013.01)

(58) Field of Classification Search
CPC combination set(s) only.
See application file for complete search history.

(56) References Cited

U.S. PATENT DOCUMENTS

| 5,881,226 | A | * | 3/1999 | Veneklase | G06F 21/42 726/16 |
|---|---|---|---|---|---|
| 7,395,333 | B1 | | 7/2008 | Saulpaugh et al. | |
| 8,135,796 | B1 | | 3/2012 | Slaughter et al. | |
| 8,781,975 | B2 | | 7/2014 | Bennett et al. | |
| 2004/0172454 | A1 | | 9/2004 | Appelman et al. | |

(Continued)

*Primary Examiner* — Fatoumata Traore
(74) *Attorney, Agent, or Firm* — Perkins Coie LLP

(57) ABSTRACT

A behavioral characteristics authentication system and method ("BCA system") that facilitates authentication of the identity of a user, registrant, or applicant of a website, application, or other accessible computer resource using a verification process that incorporates behavioral characteristics. In operation, the BCA system compares a single user's behavior with their previous behavior, a user's behavior with behavior generally attributed to non-fraudulent behavior, or a user's behavior with behavior generally attributed to fraudulent behavior. The population of other users that a user's behavior is compared with may be selected to have similar demographic or other characteristics as the user. By analyzing various behavioral characteristics associated with legitimate or fraudulent multi-factor authentication attempts, the BCA system adds another layer of security to online transactions.

20 Claims, 9 Drawing Sheets

(56) References Cited

U.S. PATENT DOCUMENTS

| | | | |
|---|---|---|---|
| 2007/0239604 A1* | 10/2007 | O'Connell | G06Q 30/06 |
| | | | 705/50 |
| 2007/0280959 A1 | 12/2007 | Meury et al. | |
| 2007/0282959 A1 | 12/2007 | Stern | |
| 2007/0293240 A1 | 12/2007 | Drennan | |
| 2007/0299915 A1 | 12/2007 | Shraim et al. | |
| 2008/0092209 A1* | 4/2008 | Davis | G06F 21/32 |
| | | | 726/2 |
| 2012/0282887 A1 | 11/2012 | Khoo et al. | |
| 2015/0088982 A1 | 3/2015 | Johnson et al. | |

\* cited by examiner

| Example Verification Rules ||
|---|---|
| Conditions 505 | Outcomes 510 |
| Total Number of Rings within range indicating legitimate User | decrease in likelihood that the transaction is fraud |
| Amount of time on call within range indicating legitimate User | decrease in likelihood that the transaction is fraud |
| Time to pickup within range indicating legitimate User | decrease in likelihood that the transaction is fraud |
| Total Number of Rings within historically defined range of User | decrease in likelihood that the transaction is fraud |
| Amount of time on call within historically defined range of User | decrease in likelihood that the transaction is fraud |
| Time to pickup within historically defined range of User | decrease in likelihood that the transaction is fraud |
| Total Number of Rings outside of historically defined range of User | increase in likelihood that the transaction is fraud |
| Amount of time on call outside of historically defined range of User | increase in likelihood that the transaction is fraud |
| Time to pickup outside of historically defined range of User | increase in likelihood that the transaction is fraud |
| Total Number of Rings within range indicating fraudulent User | increase in likelihood that the transaction is fraud |
| Amount of time on call within range indicating fraudulent User | increase in likelihood that the transaction is fraud |
| Time to pickup within range indicating fraudulent User | increase in likelihood that the transaction is fraud |

SYSTEM AND METHOD FOR UTILIZING BEHAVIORAL CHARACTERISTICS IN AUTHENTICATION AND FRAUD PREVENTION

CROSS-REFERENCE TO RELATED APPLICATION(S)

This application is a continuation of U.S. patent application Ser. No. 13/844,417, now granted U.S. Pat. No. 9,275,211, entitled "SYSTEM AND METHOD FOR UTILIZING BEHAVIORAL CHARACTERISTICS IN AUTHENTICATION AND FRAUD PREVENTION," filed on Mar. 15, 2013, the disclosure of which is incorporated herein by reference in its entirety.

BACKGROUND

Internet users regularly register with websites, cloud applications, or other web-based programs (each hereinafter a "website"). The user's registration information is generally kept confidential and used for the purpose of allowing the registrant or user to enter the website through a login process, and access the services offered by the website.

Fundamental to every secure transaction is identity authentication of a user, whether individual or individual representing a business. Identity authentication is particularly important with Internet-based transactions where user identity cannot be verified by more traditional means such as visual inspection and verification of a government-issued photo identification card. Reliable authentication and identity verification of businesses and/or individuals that engage in Internet-based commerce or information exchange is therefore a business necessity. Despite these authentication requirements, fraud is still prevalent on the Internet and often Internet fraud-impostors or "fraudsters" register or login to websites with access to sensitive data using untraceable or false email addresses and/or phone numbers, or use other such scheming methods that compromise the traditional authentication processes currently in place for such websites. For example, a common exploit employed by fraudsters is called "account takeover" where a fraudster "tricks" or steals the login credentials (e.g., username and password) of a user, often via a piece of software that records a user's keystrokes (keylogger) or as a result of a security breach on a user's computer. These "stolen" login credentials then allow the fraudster access to the user's account. Often, the effect of such a breach can be devastating to website owners and users whose secure information may be accessed, or who may otherwise be defrauded as a result. The increased occurrence of fraud is especially concerning as more commerce and transactions move online and fraudster sophistication increases.

In addition to account takeover, fraudsters often attempt "bulk registration" of hundreds or thousands of accounts at one time. Current preventive solutions such as IP blocking, email address validation, the use of "captcha" forms, and the like to ensure that the user is an individual are often ineffective in preventing fraudulent bulk registrations from occurring. Once fraudsters have created these accounts, they can leverage them to commit further fraud. By creating many accounts at one time, a fraudster may spread out fraudulent activity in ways that make it harder to detect that fraudulent activity has occurred, enabling a greater amount and variety of fraud than would be possible with a single fraudulent account, along with making identification and removal of the fraudulent accounts exceedingly difficult. In addition, while the fraudulent accounts exist, they create an extra drain on the website's physical resources, as well as pose a significant risk to the website's brand, reputation, and legitimate users.

Concerned about the potential for fraud during Internet-based transactions, security researchers highly recommend the use of authentication methods that do not rely solely on traditional, single-control methods requiring only a username and password to gain access to a website or application. In fact, in its *Supplement to Authentication in an Internet Banking Environment*, the Federal Financial Intuitions Examination Council Agencies ("FFIEC") acknowledged that there have been significant changes in security threats to Internet-based transactions, and expressed concern that the methods and controls traditionally in place have become less effective against the potential for malicious attacks that may compromise authentication and security. The FFIEC's report highly recommends use of a "layered" or "multi-factor" security for authentication and fraud prevention for Internet-based transactions. Accordingly, one such recommended "effective control" is the use of "two-factor authentication," or a method that utilizes at least an additional authentication layer in addition to the initial username and password login, often through a different access device.

The types of two-factor authentication that currently exist are centered on a first layer process that utilizes predetermined information that the user or registrant is expected to know, often referred to as "something you know." For example, predetermined information that the user might be expected to know might be a username and password, an identifier such as a social security number in conjunction with the answer to a secret question, or other unique identifier known to the user. The second layer of authentication, often referred to as "something you have," is then based on a physical item that the registrant or user has possession of and that can be used for verification of the user or registrant's identity, e.g., a physical token, or the registrant or user's telephone, mobile device, or other such communication device. Additionally, the second layer of verification can instead be achieved with biometric identification, such as fingerprint or voice recognition, often referred to as "something you are." Two or more of these second factors may be required to create a "multi-factor" authentication process, e.g., the user first authenticates with a username/password (something you know), and then is called on a communication device (something you have), and asked for a voiceprint (something you are). Unfortunately, due to the relative difficulty of incorporating a "something you are" component in addition to a "something you have" component versus the security gains from implementing such a solution, there has been limited adoption and proper utilization of multi-factor authentication measures even though security threats to Internet-based transactions continue to increase.

A recently-developed alternative to the traditional options outlined above is an additional authentication factor called behavioral biometrics. While behavioral biometrics are an offshoot of "something you are," many in the authentication industry are beginning to refer to them as a different category entirely. Behavioral biometrics are sometimes referred to as "behaviometrics" or "something you do" due to their basis in behavioral vs. physiological characteristics. While behavioral biometrics may include such diverse characteristics as typing rhythm, speech patterns, or gait, typing rhythm (or "keystroke dynamics") has typically been the focus of authentication mechanisms based on behavioral biometrics. Companies such as Deepnet Security and Intensity Analytics produce typing rhythm analysis products for authentication, however, they admit that many factors may affect the ability to properly analyze typing rhythm without error. Typing rhythm serves as an imperfect identifier of users for authentication because of the wide variance in behavior for even a single user, due to injury, fatigue, distraction, and even the everyday use of automated tools in a user's workflow. However, typing rhythm may serve as one of several characteristics, that in combination with traditional authentication measures, may help secure session-based interactions with websites—especially in situations where a user's username and password have been compromised, or the user session hijacked by a man in the middle or man in the browser attack. Session-based behavioral monitoring products currently in the market include Silver Tail Systems™, Authenware™, and Delfigo Security™, which monitor typing rhythm in conjunction with click activity and other session based behavioral biometrics.

Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 4 is a table of possible rules and their application in the BCA system.

DETAILED DESCRIPTION

Figure 1:
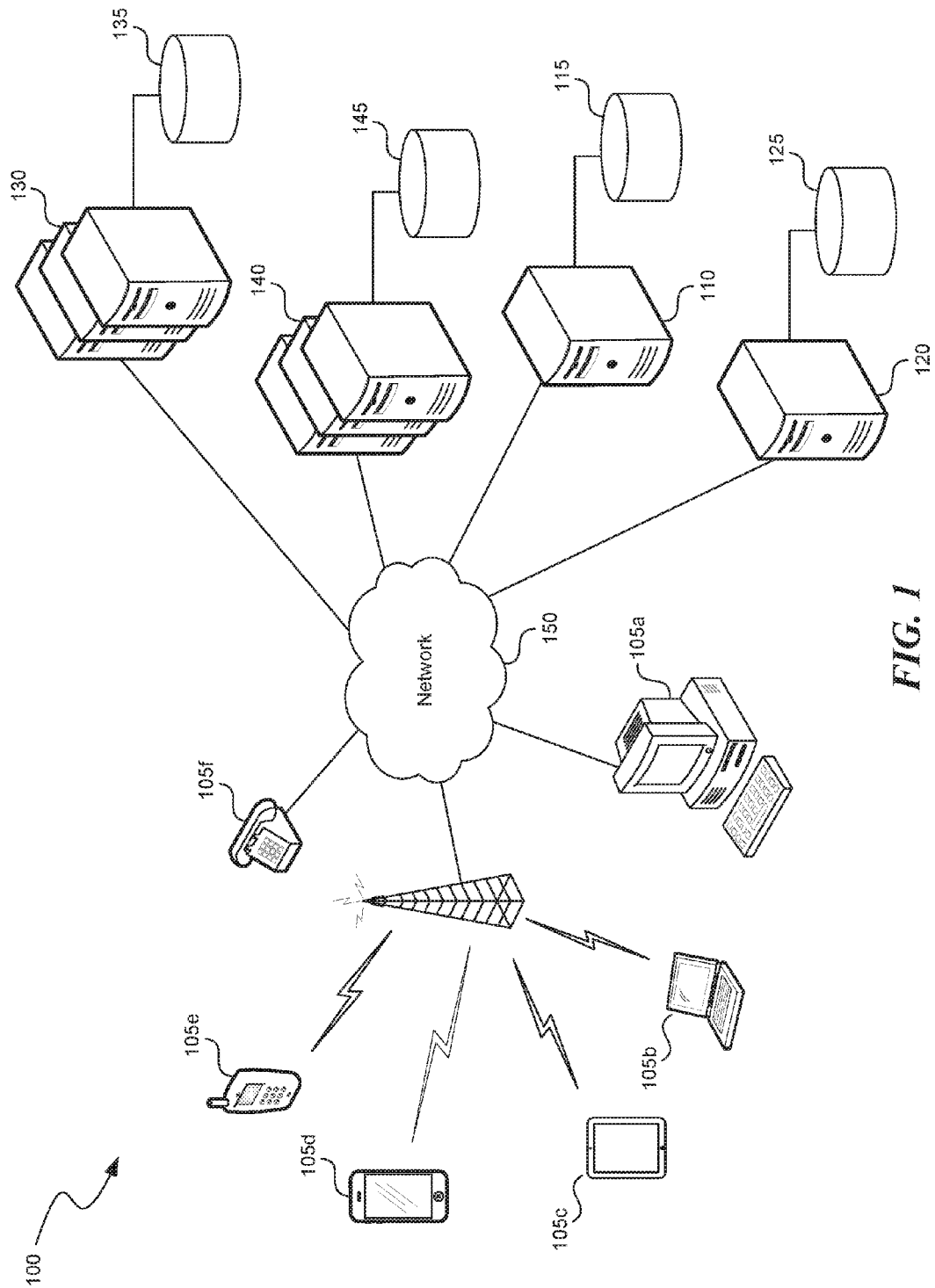
FIG. 1 is a diagram illustrating a representative environment in which a behavioral characteristics authentication (BCA) system may be implemented.

A behavioral characteristics authentication system and method ("BCA system") that facilitates authentication of the identity of a user, registrant, or applicant (hereinafter "user") of a website, application, or other accessible computer resource using a verification process that incorporates behavioral characteristics, is described herein. By analyzing various behavioral characteristics associated with legitimate or fraudulent multi-factor authentication attempts, the BCA system adds another layer of security to online transactions. The additional security provided by the BCA system reduces the opportunity for a fraudster to impersonate a legitimate user and thereby become registered with a website or take over the account of a user for the purpose of committing fraud. The BCA system may be utilized for authenticating users to access sensitive data on online accounts, applications and websites, download files, perform online transactions, store information through websites or data stores, or the like. Because of the added value behavioral characteristics provide to fight fraud, and the negligible burden placed on the user over existing multi-factor authentication (MFA) methods, the BCA system boosts adoption and proper utilization of authentication and fraud prevention measures.

In operation, the BCA system compares a single user's behavior with their previous behavior, a user's behavior with behavior generally attributed to non-fraudulent behavior, or a user's behavior with behavior generally attributed to fraudulent behavior. The population of other users that a user's behavior is compared with may be selected to have similar demographic or other characteristics as the user. The analysis of behavioral characteristics against a general population offers a benefit over solutions such as voice biometrics in that the system does not need to be trained to recognize a user's biometric signature. Instead, the user's behaviors may be automatically assessed based on the user's actions over time.

The BCA system facilitates automated fraud assessments and verification during a user login or registration process using a communication number associated with a telecommunications device. The communication number may be a phone number, a mobile device ID (e.g., an international mobile equipment identity (IMEI) number), an integrated circuit card identifier (ICCID), an electronic serial number (ESN), a mobile equipment identifier (MEID), an user identity module identifier (UIMID), an international mobile subscriber identity (IMSI), a uniform resource identifier (URI), an electronic numbering domain (ENUM), or the like. As part of a login or registration process at a website, application or other accessible computer resource, the user may be prompted to enter a communication number of a telecommunications device (e.g., a telephone, mobile device, other communication device, etc., each referred to herein as a "verification device") that is associated with the user. The communications number is utilized to send a verification message to the user's verification device. The user then performs a verification action in order to successfully complete the verification process. The verification message may include a verification code or challenge, and the verification action may comprise the user entering the verification code or challenge response into the website, application, or verification device.

Between the time that the verification message is sent to the user's verification device, and the completed verification action is performed by the user, the BCA system monitors one or more behavioral characteristics of the user. The monitored behavioral characteristics of the user and the correctness of the verification action are used to determine the level of confidence that the verification action is legitimate and should be accepted. Successful verification requires both the submission of the correct verification code or challenge, and a satisfactory behavioral assessment. It will be appreciated that one of the purposes of the verification process is to prove that the person has possession of the verification device, which is a separate channel different from where the login or registration is occurring. Another purpose is to confirm that a person is in fact completing the verification process, indicating that their device or communication number has not been compromised. It will be appreciated that behavioral assessments will be particularly useful in comparing the behavior of legitimate users with that of fraudulent bulk registration attempts across multiple communication numbers, as the behavior is likely to match other fraudulent registration or login attempts, and not match legitimate registration attempts.

Behavioral characteristics assessments serve as an effective layer of additional security in situations where other methods of preventing bulk registrations might fail, such as when an automated system defeats IP blocking, captcha mechanisms, email verification, and the like. Behavioral characteristics assessments even augment the use of more effective bulk registration detection such as phone type detection, cases where phone records might be out of date and not indicate that a phone number previously provisioned for landline or mobile use is now provisioned for VoIP, and the like. The use of two channels and the incorporation of behavioral characteristics provide greater confidence that the user accessing the website or application is not using hacked or stolen credentials or other personal information.

The BCA system allows information obtained from a previously registered user to authenticate the user on subsequent visits or logins to the website, application, or computer-accessible resource. For example, the registered user may attempt to login to a website using the user's username and password. A correct entry of both the username and password satisfies the first factor of authentication and triggers the verification message being sent to the verification device of the user. During the verification process, the user's behavior is compared with the user's behavior during previous verifications. If too many elements of the user's current behavior do not match the user's prior behavior, or if the user's current behavior matches behavior generally associated with fraud, the user may fail the verification process. When the user fails the verification process, the user may be restricted from the website, application, or resource, may be asked to repeat the verification process a second time, may receive limited access to the website or application, or the like. By comparing and matching the user's past behavior to their present behavior, an additional level of confidence is assigned to the present verification process.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Suitable Environments

The Behavioral Characteristics Authentication (BCA) system may be implemented in a suitable computing environment 100, as shown in FIG. 1. Aspects and implementations of the BCA system will be described in the general context of computer-executable instructions, such as routines executed by a general-purpose computer, a personal computer, a server, or other computing systems. Embodiment of the BCA system may also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Embodiments of the BCA system may be implemented in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the BCA system described herein may be stored or distributed on tangible, non-transitory computer-readable media, including magnetic and optically readable and removable computer discs, stored in firmware in chips (e.g., EEPROM chips), an array of devices (e.g., Redundant Array of Independent Disks (RAID)), solid state memory devices (e.g., solid state drives (SSD), Universal Serial Bus (USB)), and/or the like. Alternatively, aspects of the BCA system may be distributed electronically over the Internet or over other networks (including wireless networks). Those skilled in the relevant art will recognize that portions of the BCA system may reside on a server computer, while corresponding portions reside on a client computer. Data structures and transmission of data particular to aspects of the BCA system are also encompassed within the scope of the invention.

Referring to FIG. 1, the BCA system operates in environment 100. User devices, such as desktop computer 105a, laptop computer 105b, tablet 105c, mobile device 105d, feature phone 105e, and the like, are used by users to access websites, applications, or computer-accessible resources that are hosted by, or have functionality provided by, server computers, such as web servers 150 and application servers 160. When used to access websites or applications, user devices 105a-105e are referred to herein as "login devices". In addition, user devices may include a landline telephone 105f. When used to receive verification messages and verify a user, user devices 105a-105f are referred to herein as "verification devices." A verification device is usually a communication device, often in the user's possession at the time of login, with which a user is capable of performing verification actions.

An authentication server 110 and behavioral characteristics provider (BCP) server 120 may connect to and communicate with each other across networks 150. Networks 150 may include wired and wireless, private networks and public networks (e.g., the Internet). User devices 105a-105f use network interfaces to connect and/or communicate with networks 150, either directly, or via telephone routing hardware, wireless routers, or cell towers. Network interfaces may employ connection protocols such as direct connect, Ethernet, wireless connection such as IEEE 802.11a-n/ac, and the like to connect to networks 150. Some user devices, such as device 105f, may be equipped with circuitry to handle POTS or VoIP connections. Some user devices such as devices 105c-105e may be equipped with transceiver circuitry to handle radio communications to wirelessly communicate with nearby cell towers or base stations using wireless mobile telephone standards such as Global System for Mobile Communications (GSM), CDMA (Code Division Multiple Access), General Packet Radio Service (GPRS), and/or the like The behavioral characteristics provider (BCP) server 120 communicates with a database 125 which contains previous or expected behaviors for specific users, or behaviors which indicate legitimate use, or fraud across a population of users. The BCP server uses information in the database to generate and maintain authentication rules based on this or other information.

The web servers 130 are servers that host one or more websites and deliver web pages to requesting clients. Web servers 130 are typically coupled to one or more databases 135 containing data organized in tables or other constructs. Application servers 140 are servers that host one or more applications. Application servers allow users to connect to hosted applications and deliver information to applications installed on users' devices. Application servers 140 are typically coupled to one or more databases 145 containing data organized in tables or other constructs.

The authentication server 110 is a server handling authentication and verification of users, transactions, and/or user devices. The authentication server is coupled to a database 115, which contains data organized in tables or other constructs. When users attempt to access websites, either for the first time or on subsequent visits, requests are sent to the authentication server 110 to authenticate the user or verify a transaction. As will be described in additional detail herein, the authentication server 110 utilizes the behavioral characteristics provider (BCP) server 120 as part of the authentication or verification process.

Suitable Systems

Figure 2:
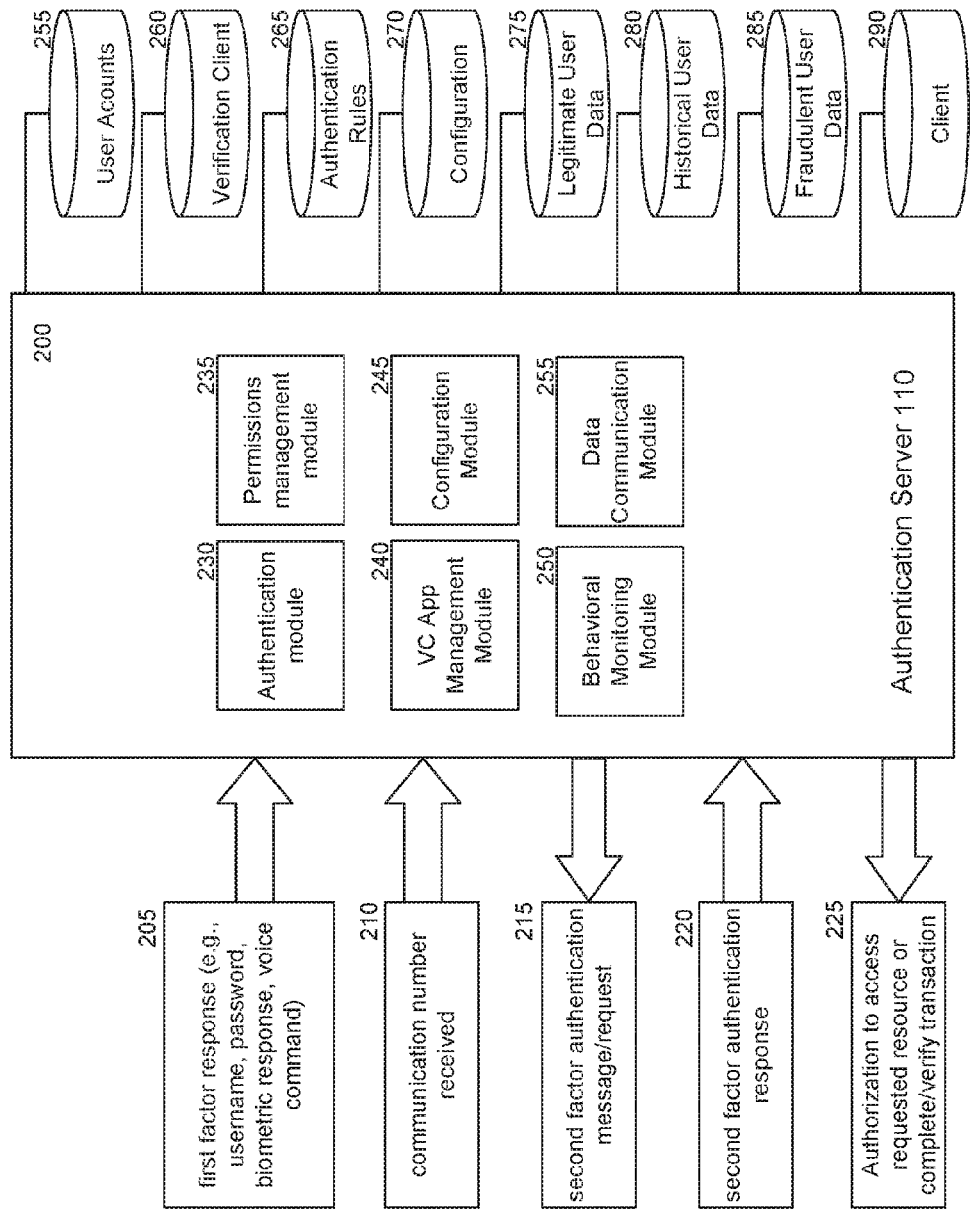
FIG. 2 is a diagram illustrating representative modules incorporated in the BCA system.

FIG. 2 is a block diagram of modules in a BCA system 200 and some of the data that is received, stored, processed and transmitted by the system. The BCA system may be implemented across one or more authentication servers 110. BCA system 200 performs a first authentication process, and a second authentication process comprising a device verification. In the first authentication process, the system receives as input user-provided first factor authentication responses. Provided the user passes the first factor authentication process, the system performs a second authentication process in the form of a device verification, and provides as output authorization to access a requested resource if the user passes the second authentication process. In the process of performing the authentication based on the second authorization process, the BCA system 200 applies one or more authentication rules to behavioral data, and in some implementations may compare behavioral data with other criteria to make a determination for successful authentication.

Various inputs may be provided to authentication server 110 as part of the authentication process. For example, a user response 205 may be provided to the authentication server 110 to allow the server to perform an authentication of the user based on a first authentication factor. The first authentication factor may be selected from the three authentication factors which include something the user knows, something the user has, and something the user is. The user response 205 may include, for example, a username and password combination, security code, token, biometric characteristic such as a fingerprint, gesture, voice command, or the like.

The user response 205 may not be necessary in those situations where a website performs a user authentication based on a first authentication factor and the authentication server 110 is only used to perform a user authentication based on a second authentication factor. Instead, a request to perform the authentication using the second authentication factor may be provided as an input to the authentication server 110. The request may be generated by another entity such as a web server hosting a website, and indicates that the user has been authenticated using a first factor and that the web server is seeking to authenticate the user using an additional factor. Alternatively, the authentication server 110 may receive a request to authenticate the user based only on a second-factor type authentication in a situation where a first-factor type authentication is not required or an earlier authentication (first-factor type or multi-factor type) has occurred at a time removed from the present authentication process, such as a user registration, financial transaction, or the like.

Authentication server 110 receives a communication number 210 associated with a device owned and/or controlled by the user. The communication number may be directly entered by the user, stored by a website and provided to the authentication server, maintained in an application on a login device and provided to the authentication server for the purpose of verifying that specific device, e.g., when a login device utilizes a communication number as a component of the application's function and the communication number is directly provided to the system for future interactions, or the like. Authentication server 110 takes user response 205 and communication number 210, and transforms the data via modules 230-250 into an authentication message or request 215 sent to the user's verification device via the provided communication number. Authentication server 110 takes the user's second factor authentication response 220, in the form of user interactions, responses, and associated behavioral characteristics, and transforms the data via modules 230-250 into an authorization 225 granting the requesting user access to the requested resource provided that the user has passed the authentication checks performed by the server 110.

The authentication server 110 includes an authentication module 230, a permissions management module 235, a verification client application management module 240, a configuration module 245, a behavioral monitoring module 250, and a data communication module 255. One or more of these modules may connect to one or more datasets or database tables 255-270 to execute queries, such as those written in Python, PhP, SQL, and the like, to retrieve and/or store data. Depending on the implementation, the modules 230-255 may be implemented in software, hardware, or a combination thereof. The operation of each of the modules will be described in additional detail herein.

The modules 230-255 access one or more tables maintained in databases to perform the user authentication disclosed herein. Authentication module 230 performs an authentication based on the first and second factors. In some embodiments, authentication module 230 performs an authentication based on the second factor, while an authentication based on the first factor is performed by another entity such as the web server hosting the website. To perform the first factor authentication, authentication module 230 receives and processes user response 205, such as a username and password, and compares the response with data retrieved from database tables such as user accounts database 255. The user accounts database includes data that is associated with an account of the user at a website or at a service provided via an application, and includes such data fields as user ID or username, password, biometric signature, name, address, email, phone number or communication number, unique device identifier, permissions, permitted entities. The authentication module 230 applies rules that are stored in authentication rules database 265 or client database 290 to assess whether the user response satisfies the stored account information, thereby verifying the user using the first factor authentication.

To initiate the second factor authentication, authentication module 230 receives a communication number 210 associated with the user or retrieves the communication number from verification client database 260. The verification client database 260 contains information necessary for identifying and verifying a user device, including data fields such as user ID or username, phone number/communication number, and the like. The second factor authentication includes transmitting the second factor authentication message 215 and receiving the second factor authentication response 220. Authentication module 230 may generate the authentication message and receive the authentication response directly or via data communication module 250 to a website or user. The authentication module 230 also receives monitored behavioral data either directly from an application on the user's device, from authentication module 230, from a behavioral monitoring module 250, or from a third party such as a telco, SMS provider, and the like. The behavioral data characterizes various aspects of the user's interaction with the verification device. The authentication response is compared with authentication rules that are contained in the authentication rules database 265 to assess whether the response satisfies the applicable rules, thereby verifying the user using the second factor authentication. Those authentication rules include conditions that are based on the received behavioral data.

The authentication rules database 265 contains rules that are used by the authentication module 230 for the purpose of evaluating whether an authentication or verification attempt should be attempted, and whether or not such an attempt has been successful. The authentication rules database 265 may include data fields such as rule ID, conditions, outcome, and the like. Conditions may be based on data received from behavioral monitoring module 250, data from a legitimate user data database 275 which contains data identified as a result of legitimate user behavior, a user history database 280 which contains data relating to the historical behaviors of particular users, and a fraud data database 285 which contains data identified as the result of fraudulent user transactions. Each of these databases will be addressed in turn.

The fraudulent user database 285 includes data characterizing user actions that are likely to reflect fraudulent behavior on the part of different populations of users. As an example, the fraudulent user database may include data fields relating to a live call comprising time to pickup (as measured from start of dialing), time "off hook" (time from when the user picks up the call until a hang up), total number of rings, total amount of time on call (as measured from start of dialing to call disconnect), amount of time spent inputting response (keypress, vocal, and the like), amount of time between each keypress, and amount of time each key is pressed, whether call is answered by a person or a voicemail system; fields relating to a voicemail system comprising length of greeting and content of greeting; fields relating to a synchronous communication comprising time to establish connection, duration of session once session is established, total amount of communication time (as measured from initiation of connection to time of disconnect), amount of time spent inputting response (keypress, vocal, and the like), and amount of time each key is pressed; fields relating to an asynchronous communication comprising amount of time until response is sent by the user, amount of time until response is received by the system, amount of time spent inputting response (keypress, vocal, and the like), amount of time between each keypress, and amount of time each key is pressed; and fields relating to more than one communication type comprising number of correct/incorrect responses during a verification attempt, number of verification attempts, length of time between verification attempts, fraud level, date, time, and the like.

In contrast, the legitimate user database 275 includes data characterizing user actions that are likely to reflect proper or legitimate behavior on the part of different populations of users. They include many of the same data fields as are contained in the fraudulent user database 285, but with those parameter values reflecting legitimate (rather than fraudulent) behavior.

The historical user database 280 includes data characterizing the past actions of each particular user that has been authenticated by the authentication module 230. Characteristics of the user's current actions may be compared with past actions to determine whether the current actions of the user are consistent with, or sufficiently similar to, the user's past actions to indicate that the user is the same individual. The historical user database 280 may include aggregated data fields similar to those in the fraudulent user database, along with fields including data of the historical range of legitimate actions for that user as applied to each of the fraud data style fields, successful verification count, failed verification count, total verification count, and the like.

Behavioral monitoring module 250 records all system-initiated and client-initiated network interactions by monitoring related network signals as they occur and creating a timestamp for each interaction. Keypresses and keystrokes by the user are monitored and recorded in the same fashion as network interactions. For example, behavioral monitoring module 250 records the time at which the system initiates a voice call, a synchronous session such as a VoIP session, an instant messaging session, mosh session, SSL session, application session, and the like. The behavioral monitoring module may send an asynchronous message including any events such as keystrokes, keypresses, pickup, and the like, that occur during a call or session. The behavioral monitoring module may also send a message at the time of client or system disconnect. The module records the events with timestamps, or calculates and stores the duration of difference between sequential events.

FIG. 4 is a table 500 listing example conditions 505 that are utilized by authentication module 230 to test data received from the behavioral monitoring module 250. Each authentication rule analyzed by the authentication module is based on one or more conditions 505. Each condition will have a corresponding determined range (not shown) for the condition. If the authentication module determines that a condition in an authentication rule is satisfied, the module will apply a corresponding adjustment 510 in its overall assessment of fraudulent activity. Certain conditions that are determined to be satisfied will suggest a higher likelihood that a transaction is fraudulent, whereas other conditions that are satisfied will suggest a lower likelihood that the transaction is fraudulent. The authentication module 230 may test one or more of the conditions when performing each authentication test. Using a combination of conditions may provide greater accuracy when assessing the likelihood that a transaction is fraudulent. Additionally, individual conditions or combination of conditions may have different weights or values for each condition contained within the rule. For example, an authentication rule use an equation where a time to pickup within a range indicating fraud is weighted higher, a number of rings is rated lower, and a length of call that does not indicate fraud is weighted lower, i.e., authentication rule=(time to pickup×0.7)−(number of rings×0.1)+(length of call×0.2). Scores above a certain threshold for the rule are deemed to indicate fraudulent behavior.

Authentication server 110 may further include permissions management module 235 configured to obtain and manage permission from users for communicating with the user's communication devices. The permissions management module allows a user to specify whether the authentication server is allowed to send communications to the user via push notifications. Permissions management module 235 may also obtain, manage and track other permission parameters such as permission expiration date.

Application management module 235 includes facilities for managing applications that are installed on verification devices. A received communication number 210 may be evaluated by the authentication module, and identified as being attached to device having a pre-installed verification client application (e.g., by a manufacturer or retailer) or an application installed by a user. That is, device may have been purchased by the user with a verification client application already installed on the device, or the user may have downloaded the application from a website or app store. If an application has been previously installed, the identified verification client application may then be sent the second factor authentication message/request 215. If an application has not been previously installed on a device, the application management module includes computer executable instructions to coordinate installation of an application on the user device, periodically update the application, obtain and route permissions to permissions management module 235, and/or the like. The user may be required to download and install an application on each device that is intended to operate with the authentication server 110.

Configuration module 245 generates user interfaces to allow a system client to set configuration parameters for authentication. For example, in one embodiment, a website may use BCA system and want to specify that only a single authentication based on the second-factor is to be performed by authentication server 110. The website or client of the authentication server may utilize the user interface generated by the configuration module 245 to specify that only authentication using the second factor is to be performed. The website or client may also provide additional configuration information such as selecting or specifying certain rules for authenticating users, defining the number of attempts that are allowed by a user, and/or the like. The configuration module stores received configuration parameters in configuration database 270. Configuration database 270 may include data fields such as client ID, rules ID, thresholds for attempts, and the like. Furthermore, client database 290 may be utilized by the configuration module 245 to present a website that is tailored to each client. For example, the website may include a client logo and other client info. Client database 290 may include data fields such as client ID, client name, client address, billing, and the like.

Data communication module 250 is configured to facilitate communication with user communication devices 105a-f, behavioral characteristics provider (BCP) server 120, and any other external services that communicate with the authentication server 110. It will be appreciated the modules 230-255 in FIG. 2 are representative of the various functions implemented by the system, and may be consolidated into a single module or multiple different modules in different implementations.

Example Processing

Figure 3:
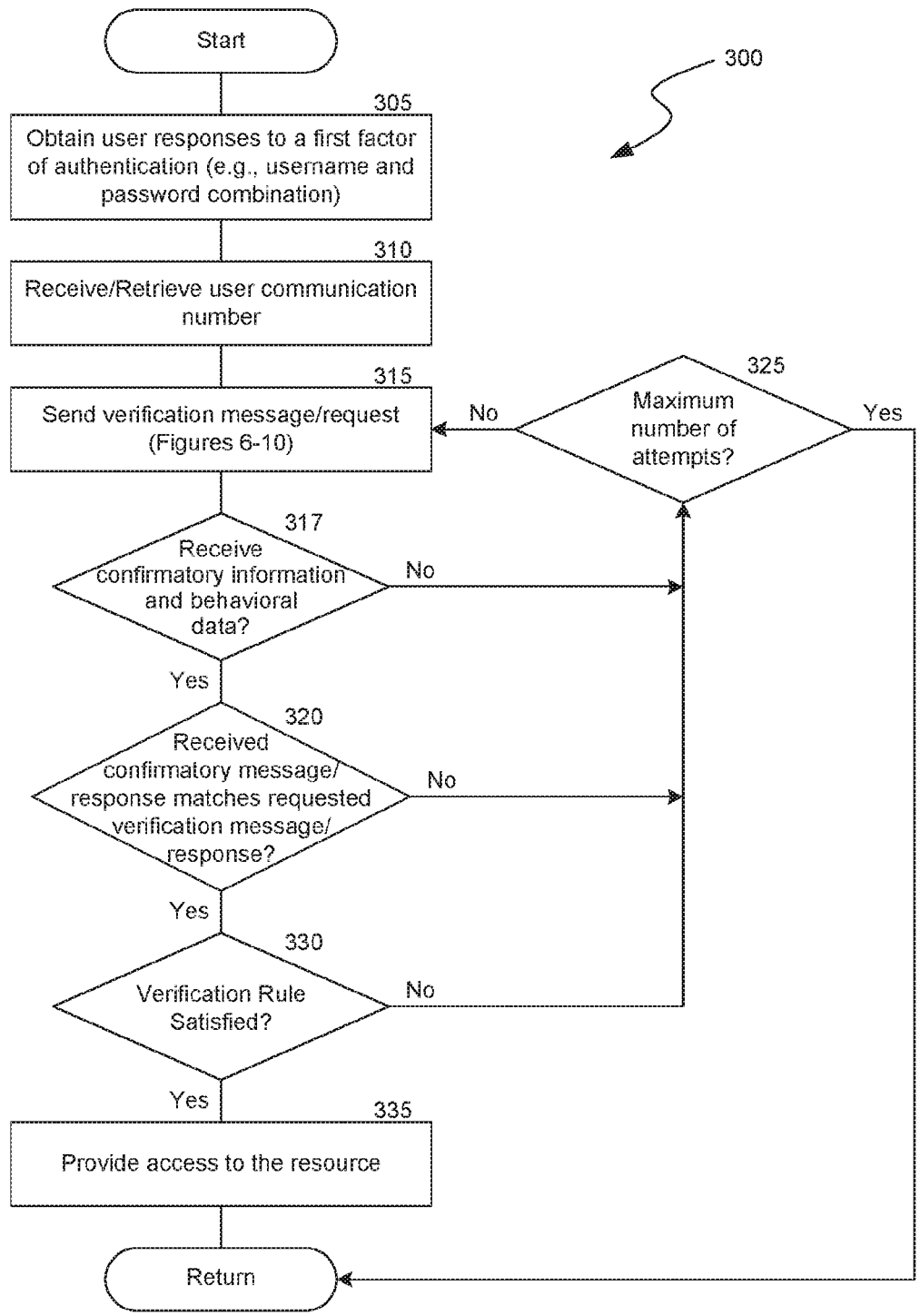
FIG. 3 is a logic flow diagram illustrating authentication by the BCA system.

As previously noted, the authentication module 230 incorporates behavioral characteristics assessments into the authentication process that is performed by the module. FIG. 3 details the logic flow of a process 300 implemented by the BCA system that incorporates behavioral characteristic analysis in assessing whether a user should be allowed to login to a website, application, or other computer-accessible resource. A user inputs a user name and password as a first authentication factor at block 305. At block 310, the system uses the received name and password to identify a communication number associated with the user. At block 315, one of several methods outlined in FIGS. 6-10 are used to send a verification message/request to the user while monitoring the interaction of the user for behavioral characteristics. The interaction may relate to the delivery of a verification message/request, the receipt of a verification message/response, or both. The message may be sent via a phone call, SMS message, push notification, or the like. The verification message/request contains a one-time password (OTP) or other piece of confirmatory information that is to be acted upon by the user. In some embodiments, an application on a user's verification device may independently generate the confirmatory information that is to be acted upon by the user, via an OTP generating component synchronized with the system. A code generated on the verification device may expire after a given amount of time, so that a code generated via the code generating component cannot be copied and used to complete a verification without the device at a later time.

At decision block 317, the system waits to receive a confirmatory message/response from the user's verification device as well as behavioral data characterizing various aspects of the user's interaction with the verification device. If no confirmatory information is received within a specified time period, processing continues to decision block 325. The system allows the user to perform a limited number of repeat attempts. If the number of allowed attempts hasn't been exceeded at block 325, processing continues at block 315 where another verification message/request is transmitted to the user device. If the maximum number of attempts has occurred at block 325, the process is terminated.

If confirmatory information and behavioral data is received from the verification device, processing continues to decision block 320. At block 320, the system compares the received confirmatory information with the expected information (i.e., the expected confirmation response). If there is a match between the received confirmatory information and the expected information, processing continues to block 330. If no match is found between the received confirmatory information and the expected information, however, processing continues to block 325. If the number of allowed attempts hasn't been exceeded at block 325, processing continues at block 315 where another verification message/request is transmitted to the user, otherwise the process is terminated.

At decision block 330, the system applies an authentication rule to the received behavioral data. If the authentication rule is not satisfied at block 330, the system may allow the user to complete a limited number of verification re-attempts by determining whether the number of re-attempts has not exceeded the specified threshold at block 325. If, however, the system determines that the authentication rule at block 330 is satisfied, at block 335 the user is provided access to the resource by the system. Access may be provided directly by the system, or it may result from the system sending a "verification authorized" message to a service that required the verification to be performed.

In situations where a first factor authentication is not performed, only the steps in blocks 310-335 are performed. This might occur, for example when providing verification for a secure interaction other than a user login, such as verifying a specific device for use with an application (potentially prior to login or account creation), or for the purpose of registering a communication number with a website or application, or for a new user registration at a website or application.

Figure 5:
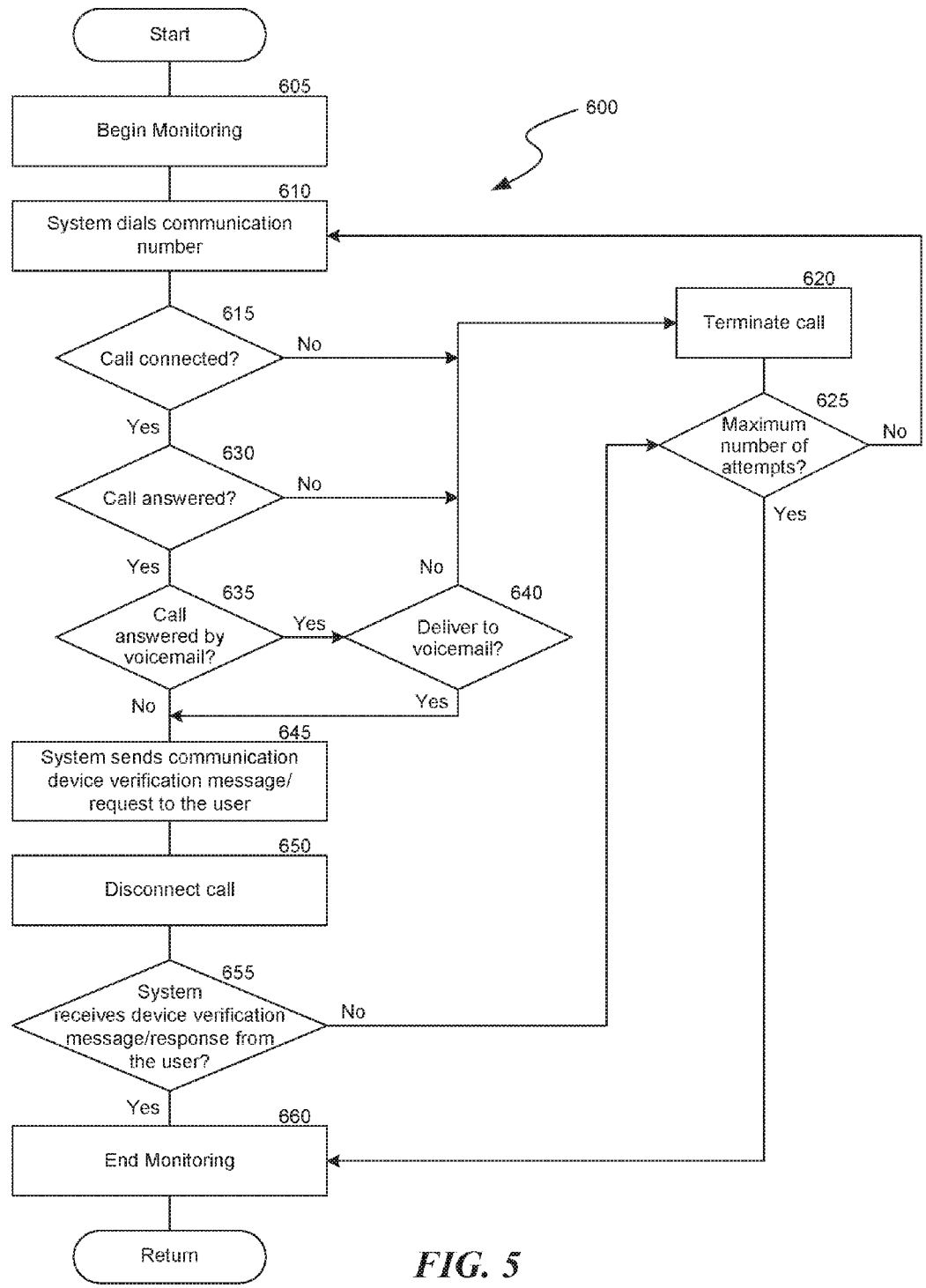
FIG. 5 is a logic flow diagram illustrating monitoring a live call in the BCA system.

FIG. 5 details a logic flow of a process 600.

for delivering a verification message to a user via a voice call and receiving the requested response from the user after the call has ended. At block 605, the system begins monitoring the telecommunications line used to connect to the verification device before dialing the communication number that is associated with the verification device. Such monitoring is described in conjunction with behavioral monitoring module 250. At block 610, the system dials the communication number. At block 615, the system determines whether or not the call has connected. The system records behavioral characteristics associated with the call, such as the total number of rings before pick-up. If the call is not connected, the system terminates the call at block 620 and assesses whether a maximum number of attempts have been reached at block 625. If the maximum number of attempts has been reached, the system ends monitoring at block 660 and the logic flow terminates. If the maximum number of attempts has not been reached, the system returns to block 610 and another call to the verification device is initiated by the system.

At block 630, the system determines whether or not the call has been answered. The system records behavioral characteristics such as time to pick-up (as measured from start of dialing by the system until pickup by the user) and the time "off hook" (time from when the user picks up the call until a hang up by the user). If the call has not been answered, the system terminates the call at block 620, assesses whether a maximum number of attempts have been reached at block 625, and either terminates additional attempts or initiates another call.

If the call is answered, the system determines whether the call is answered by an answering machine/voicemail system at block 635. If the call is answered by an answering machine/voicemail system, the system records behavioral characteristics such as the presence of a greeting, whether or not the greeting is a computer generated greeting or a recorded greeting, the content and length of the greeting, and the like. At a block 640, the system determines whether or not to deliver the verification message/request to the user's voicemail. If the system does not deliver to voicemail at block 640, the system terminates the call at block 620, assesses whether a maximum number of attempts have been reached at block 625, and either terminates additional attempts or initiates another call.

If the system determines that it will deliver the verification message/request to voicemail, or if the call was not answered by voicemail, the system communicates the verification message/request to the user at block 645. The verification message/request is provided to the user by the system in a recorded message. The system records behavioral characteristics such as any response, or lack thereof, from the user. Once the verification message/request has been delivered to the user, the system waits for the user to hang up for a reasonable time before disconnecting the call at block 650. The system records behavioral characteristics such as the time "off hook", the total amount of time on call (as measured from start of dialing to call disconnect), and the like.

After the call is disconnected, the system waits to receive a verification message/response from the user at block 655. If a verification response is received, the system records behavioral characteristics such as a time to receive the response, the amount of time for all keystrokes, and the amount of time between each keystroke. The system then ends monitoring at block 660. If a response has not been received after a period of time, the system assesses whether a maximum number of attempts have been reached at block 625 and either terminates additional attempts or initiates another call. After terminating monitoring at block 660, the system returns to complete the verification as outlined in FIGS. 2-4.

Many of the monitored live call characteristics may be used by the system, alone or in combination, to assess the likelihood of fraud. In some embodiments, a time to pick up which is greater or equal to a specific threshold value may indicate fraud, which may on its own or in conjunction with other monitored characteristics cause the verification to be unsuccessful, either directly, or through the adjustment of a score which may be generated based on weighted or unweighted values of the monitored characteristics which triggers the application of an authentication rule as described in FIG. 4. In a similar fashion, a time to pick up that is higher than a specific threshold, in conjunction with a time on a call lower than a specific threshold, may be a stronger indication of fraud than either monitored factor on its own.

Figure 6:
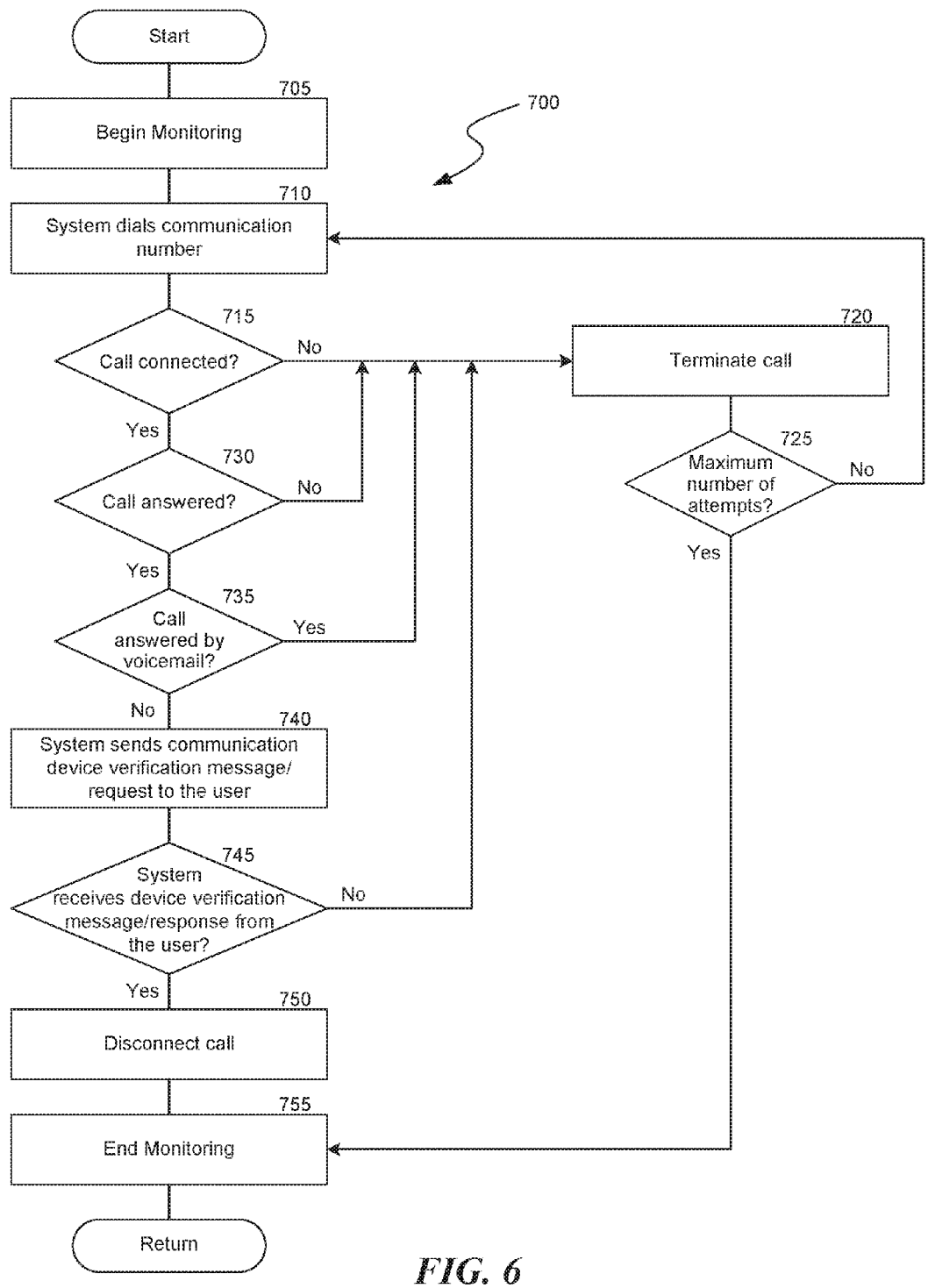
FIG. 6 is a logic flow diagram illustrating an alternative embodiment of monitoring a live call in the BCA system.

FIG. 6 details a logic flow of a process 700 for delivering a verification message to a user during a voice call session and receiving the requested response from the user during the call. The process in blocks 705-735 represent the same process as the process in blocks 605-635. Namely, the system begins monitoring, dials a communication number of a user's verification device, and then proceeds to assess whether the call is connected, answered, or answered by voicemail. Calls may be terminated and retried by the system if a maximum number attempts is not reached. If the call is not answered by a message machine/voicemail system, but is instead answered by a live person, at a block 740 the system delivers the verification message/request to the user. Once the verification message/request has been delivered to the user, at block 745 the system waits for the user to respond the verification message/request for a reasonable time. While waiting for the response, the system monitors behavioral characteristics such as the amount of time to receive a response from the user. If the user does not respond, the system records the lack of response and the call terminates at block 720 and an connection retry is initiated if a maximum number of attempts has not been reached. If the user does respond, the system monitors the user's response and captures behavioral characteristics associated with the response, such as the tone of the user, any inflections by the user, a sequence and rate of key-presses by the user, the existence and length of any pauses by the user, etc. After the user disconnects the call at block 750, and they system completes its monitoring at a block 755. In association with the call being disconnected, the system captures such behavioral characteristics as the time "off hook", the total amount of time on call, and the like. After terminating monitoring at block 755, the system returns to complete the verification as outlined in FIGS. 2-4. Many of the monitored live call characteristics, including the behavioral characteristics of the verification response received by the system, may be used by the system, alone or in combination, to assess the likelihood of fraud.

Figure 7:
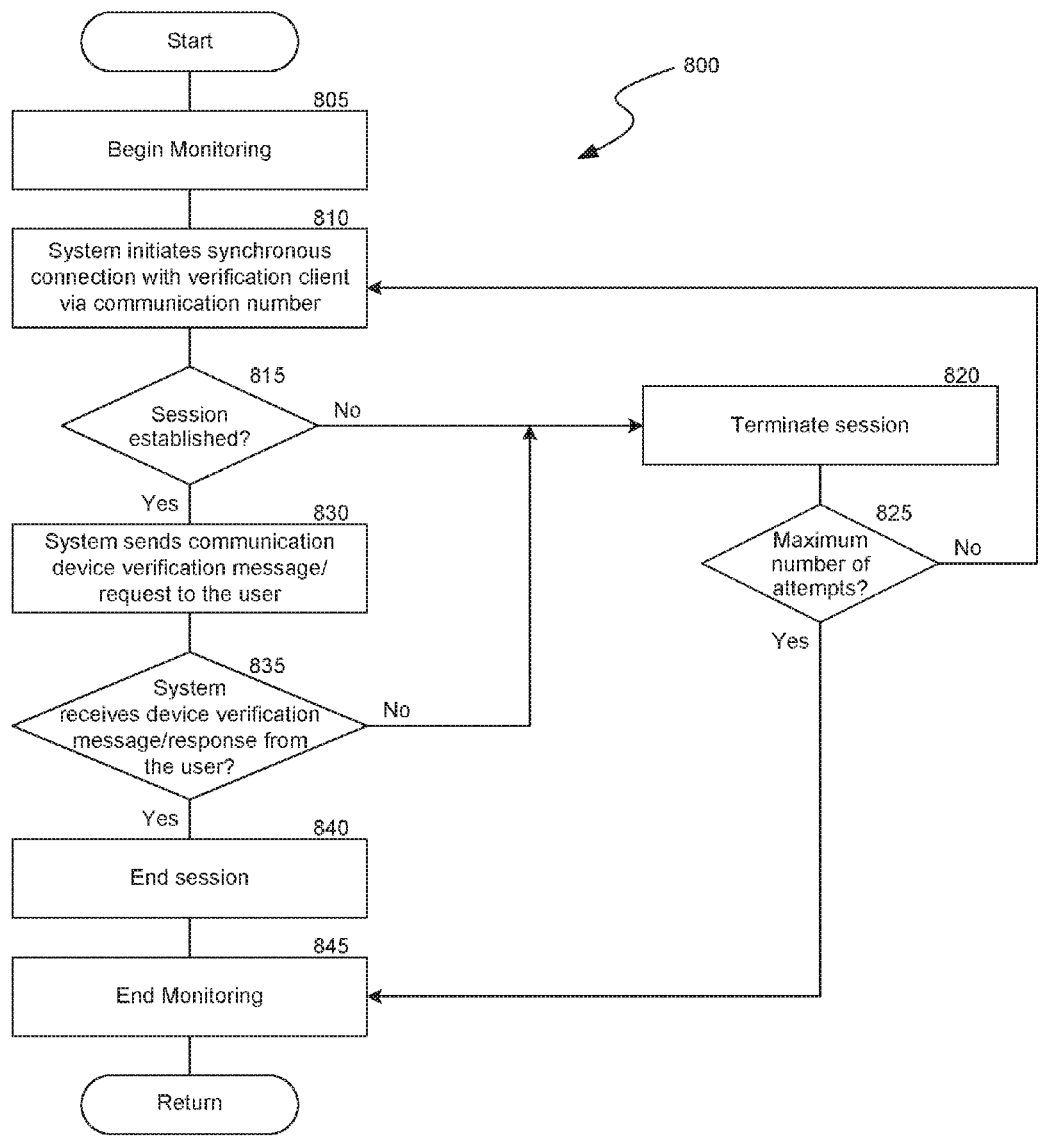
FIG. 7 is a logic flow diagram illustrating monitoring a synchronous communication session in the BCA system.

FIG. 7 details a logic flow of a process 800 for delivering a verification message to a user during a live synchronous session outside of a voice call, such as a network session established between the system and an application on the verification device such as via VoIP, instant messaging, mosh, SSL, or an application based session. The established network session allows for voice communication, text entry, or other interactive response such as pressing a presented button by the user on the verification device. At block 805, the system begins monitoring the network session that is being established between the system and the verification device. At block 810, the system attempts to establish a synchronous session with the verification client. At a decision block 815, the system determines if a session has been established. If the session has not been established, the system terminates the session at block 820, assesses whether a maximum number of attempts have been reached at block 825, and either ends monitoring or attempts to re-initiate the synchronous session depending on whether the maximum number of attempts has been reached. If the session has been established, the system records behavioral characteristics associated with establishing the session, such as the time to establish the connection, the quality of the connection, and the like. The system then delivers the verification message/request to the user at block 830.

Once the verification message/request has been delivered to the user, the system waits for the user to respond the verification message/request for a reasonable time at block 835. During this period, the system records behavioral characteristics such as the amount of time to receive a response from the user. If the user does not respond, the system terminates the session at block 820 and either terminates additional attempts or initiates another synchronous connection session. If the user does respond, the system records behavioral characteristics such as a time to receive the response. At a block 840, the system ends the session at block 840. The system records behavioral characteristics such as the total amount of communication time, the duration of the session (as measured from initiation of connection to time of disconnect), and the like. After ending monitoring at block 845, the system returns to complete the verification as outlined in FIGS. 2-4.

Figure 8:
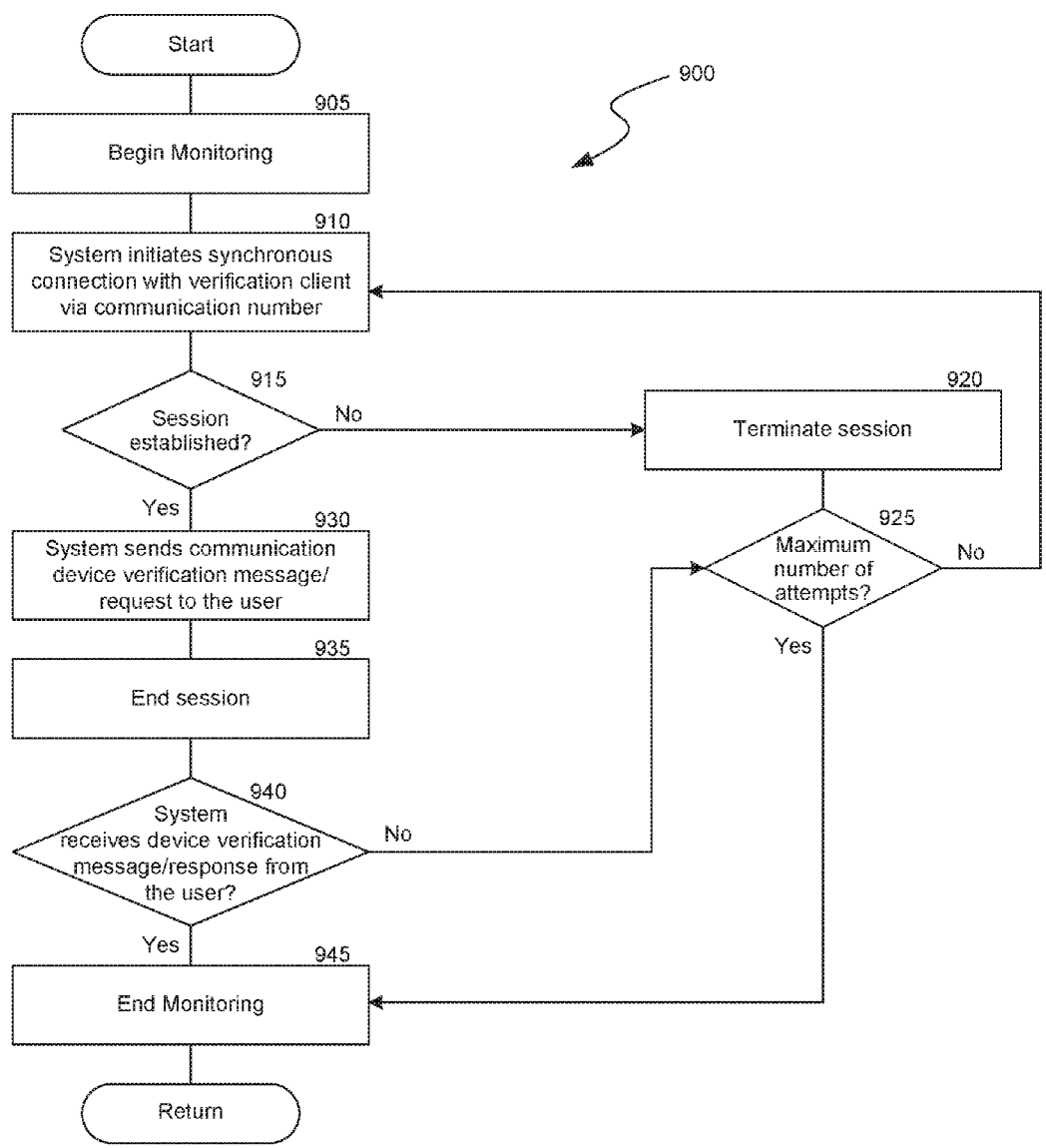
FIG. 8 is a logic flow diagram illustrating an alternative embodiment of monitoring a synchronous communication session in the BCA system.

FIG. 8 details a logic flow of a process 900 for delivering a verification message to a user during a live synchronous session outside of a voice call, such as a network session established between the system and an application on the verification device. The established network session allows for voice communication, text entry, or other interactive response such as pressing a presented button by the user on the verification device. Unlike the process 800, however, in the process 900 the response by the user is received after the end of the session. The process in blocks 900-930 represent the same process as the process in blocs 805-835. Namely, the system begins monitoring, establishes a communication session, and sends a verification message/request to the verification device of the user. Sessions may be terminated and retried by the system if a maximum number attempts is not reached. Once the verification message/request has been delivered to the user, at block 935 the system ends the session. Upon termination of the session, the system records behavioral characteristics of the session such as the total amount of communication time, the duration of the session, and the like.

At a block 940, the system waits for the user to respond to the verification message/request for a reasonable period of time. If the user does not respond, the system records the lack of response, assesses whether a maximum number of attempts have been reached at block 925, and either ends the monitoring or attempts to re-establish another session. If the user does respond, the system records behavioral characteristics such as the time to receive the response. After ending monitoring at block 945, the system returns to complete the verification as outlined in FIGS. 2-4.

Figure 9:
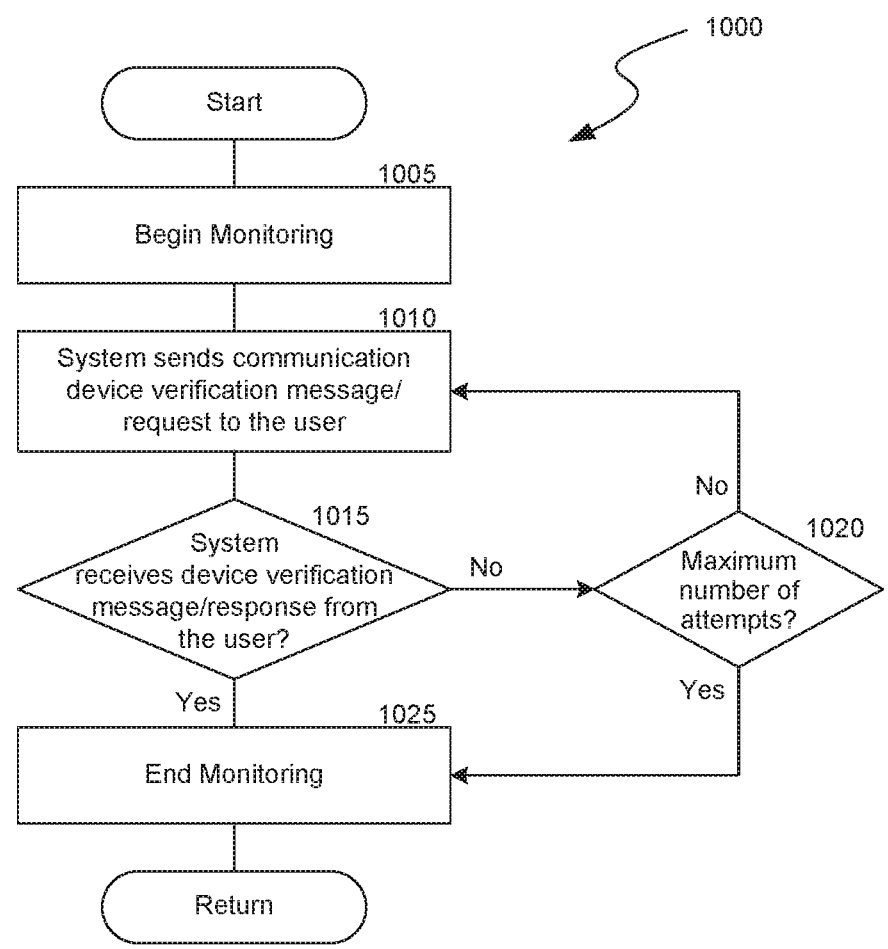
FIG. 9 is a logic flow diagram illustrating monitoring an asynchronous communication session in the BCA system.

FIG. 9 details a logic flow of a process 1000 for delivering a verification message/request to a user verification device via an asynchronous communication, such as a text message including an SMS, MMS, or the like. The verification message/response from the user is also received via a text message, including an SMS, MMS, or the like. At block 1005, the system begins monitoring all messages with the user. At block 1010, the system sends the verification message/request to the user using the communication number associated with the user's verification device. The system then waits for the user to respond to the verification message/request for a reasonable time at block 1015. If the user does not respond, the system records the lack of response, assesses whether a maximum number of attempts have been reached at block 1020 and either ends monitoring or re-sends another verification message/response. If the user does respond, the system ends monitoring at block 1025. The system records behavioral characteristics of the response, such as the amount of time to receive the response from the user. After ending monitoring, the system returns to complete the verification as outlined in FIGS. 2-4.

While certain behavioral characteristics have been identified as being monitored and recorded by the system in FIGS. 6-10, it will be appreciated that other characteristics may be recorded as well. For example, other behavioral characteristics include a number of verification attempts, a length of time between verification attempts, the calendar date of each verification, the time at which each verification occurred, and the like. In some embodiments, a number of incorrect attempts above a specific threshold may indicate fraud, which may on its own or in conjunction with other monitored characteristics cause the verification to be unsuccessful, either directly, or through the adjustment of a score which may be generated based on weighted or unweighted values of the monitored characteristics. In a similar fashion, a number of incorrect verification attempts above a specific threshold in conjunction with a length of time between attempts lower than a specific threshold may be a stronger indication of fraud than either monitored factor on its own. It will be appreciated by those skilled in the art that some or all of these monitored characteristics may be combined to determine whether a verification attempt is successful.

Behavioral characteristics monitored by the system include session characteristics as well as characteristics attributable to user actions if the user response is received during a live call or synchronous session. Behavioral characteristics associated with affirmative user actions may include the amount of time a user spent inputting a response (keypress, vocal, swipe, or the like), the amount of time between each keypress by the user, the length of time that each key is pressed by the user, or the like. In some embodiments, an amount of time spent inputting responses that is below a specific threshold may indicate fraud, which may on its own or in conjunction with other monitored characteristics cause the verification to be unsuccessful, either directly, or through the adjustment of a score which may be generated based on weighted or unweighted values of the monitored characteristics. An amount of time spent inputting responses that is below a specific threshold in conjunction with an equal amount of time between each keypress, and an equal amount of time that each key is pressed, may be a stronger indicator of fraud than the individual characteristics on their own.

Affirmative user actions may also include actions relating to a synchronous communication. The system may record behavioral characteristics associated with synchronous communications, such as an amount of time that a user spent inputting a response (keypress, vocal, swipe, or the like), the amount of time between each keypress by the user, the length of time that each key is pressed by the user, or the like. In some embodiments, an application operating on the verification device may monitor affirmative user actions, and transmit the details of the monitored actions to the system (as they happen, or after completion of any affirmative user actions) during the established communication session.

In some embodiments, historical data for a specific user may be maintained by the system for both successful and unsuccessful verifications, such that historical behavior can be another source of authentication rules for the user in the future. Behavior related to multiple failed verification attempts may indicate a fraudulent verification attempt in the future even where such an attempt would otherwise be considered successful if it does not comport with the user's historical behavior. However, the same information should not be used to authenticate an unsuccessful attempt, even where it matches behavior or generally or previously successful verifications.

In addition, historical data from groups of users such as previous users of the system or information about users collected from third parties may be used to create aggregated historical user groups of both legitimate and fraudulent users based on the collected behavioral characteristics and resulting determinations of legitimacy or fraud made by the system or third parties. The system analyzes all or portions of the historical data in order to calculate various thresholds or ranges that are indicative of legitimate behavior or fraudulent behavior. For example, an analysis of the historical data may indicate that a time to pickup between a certain range or below a specific time threshold indicates fraudulent users, where a time to pickup outside of the range or above the specific time threshold may indicate legitimate users.

It will be appreciated by those skilled in the art that historical behavior may be made up of any of the monitored characteristics of an individual user, and may also contribute to aggregated characteristics that generally indicate legitimate users, and/or characteristics that generally indicate fraud. A comparison of some, all, or other characteristics with or without other authentication criteria may be used as part of an assessment as to whether a verification action as part of a transaction, registration, or login attempt may be allowed.

Those skilled in the art will appreciate that the actual implementation of the data storage area may take a variety of forms, and the phrase "database" is used herein in the generic sense to refer to any area that allows data to be stored in a structured and accessible fashion using such applications or constructs as databases, tables, linked lists, arrays, flat files, and so on. Those skilled in the art will further appreciate that the depicted flow charts may be altered in a variety of ways. For example, the order of the steps may be rearranged, steps may be performed in parallel, steps may be omitted, or other steps may be included.

I claim:

1. A method of verifying that a user is authorized to access a computer-accessible resource, the method comprising:
   maintaining, for a plurality of authenticated users, data reflecting historical voice call characteristics indicative of each of the authenticated users;
   maintaining a communication number of a verification device associated with a user;
   receiving a request by the user to access a computer-accessible resource;
   utilizing the communication number to establish a voice call session with the user's verification device in order to send a request that the user perform a verification action;
   monitoring one or more voice call characteristics during the voice call session, the monitored one or more voice call characteristics including timing data related to the voice call session;
   determining whether the user successfully performed the requested verification action;
   determining whether an authentication rule has been satisfied by:
      identifying the authenticated user that the user purports to be,
      comparing the monitored one or more voice call characteristics of the user to the maintained voice call characteristics of the authenticated user, and
      evaluating whether the monitored one or more voice call characteristics fall within ranges of the authenticated user's voice call characteristics; and
   if the verification action has been successfully completed by the user and if the authentication rule has been satisfied by the monitored voice call characteristics, generating an authentication response that indicates that the user has been authenticated for access to the computer-accessible resource.

2. The method of claim 1, further comprising saving the monitored one or more voice call characteristics to the maintained voice call characteristics of authenticated users when the authentication rule has been satisfied.

3. The method of claim 1, wherein the requested verification action is performed by the user during the voice call session.

4. The method of claim 3, wherein the timing data relates to user actions during performance of the requested verification action.

5. The method of claim 1, wherein the monitored one or more voice call characteristics are comprised of at least one of:
   an amount of time that was taken by the user to answer a phone call;
   an amount of time that a phone was "off hook" during a phone call;
   a tone or inflection of the user; or
   an amount of time taken by the user to perform the requested verification action.

6. The method of claim 1, wherein the authentication rule includes comparing the monitored one or more voice call characteristics with historical data that reflects characteristics of legitimate users.

7. The method of claim 1, wherein the one or more voice call characteristics include affirmative user actions made during the requested verification action.

8. The method of claim 1, wherein the voice call session is a VoIP session.

9. The method of claim 1, wherein the request to the user's verification device that the user perform a verification action causes a code to be communicated to the user and instructions to be presented to the user on how to perform the verification action.

10. The method of claim 9, wherein the communicated code is generated by the verification device or transmitted to the verification device.

11. The method of claim 1, wherein the request to the user's verification device that the user perform a verification action is contained in a verification message.

12. A non-transitory computer-readable medium encoded with instructions that, when executed by a processor, perform a method of verifying that a user is authorized to access a computer-accessible resource, the method comprising:
   maintaining, for a plurality of authenticated users, data reflecting historical voice call characteristics indicative of each of the authenticated users;
   maintaining a communication number of a verification device associated with a user;
   receiving a request by the user to access a computer-accessible resource;
   utilizing the communication number to establish a voice call session with the user's verification device in order to send a request that the user perform a verification action;
   monitoring one or more voice call characteristics during the voice call session, the monitored one or more voice call characteristics including timing data related to the voice call session;
   determining whether the user successfully performed the requested verification action;
   determining whether an authentication rule has been satisfied by:
      identifying the authenticated user that the user purports to be,
      comparing the monitored one or more voice call characteristics of the user to the maintained voice call characteristics of the authenticated user, and
      evaluating whether the monitored one or more voice call characteristics fall within ranges of the authenticated user's voice call characteristics; and
   if the verification action has been successfully completed by the user and if the authentication rule has been satisfied by the monitored voice call characteristics, generating an authentication response that indicates that the user has been authenticated for access to the computer-accessible resource.

13. The non-transitory computer-readable storage medium of claim 12, further comprising instructions that when executed by the processor cause saving the monitored one or more voice call characteristics to the maintained voice call characteristics of authenticated users when the authentication rule has been satisfied.

14. The non-transitory computer-readable storage medium of claim 12, wherein the requested verification action is performed by the user during the voice call session.

15. The non-transitory computer-readable storage medium of claim 14, wherein the timing data relates to user actions during performance of the requested verification action.

16. The non-transitory computer-readable storage medium of claim 12, wherein the monitored one or more voice call characteristics are comprised of at least one of:
   an amount of time that was taken by the user to answer a phone call;
   an amount of time that a phone was "off hook" during a phone call;
   a tone or inflection of the user; or
   an amount of time taken by the user to perform the requested verification action.

17. A system for verifying that a user is authorized to access a computer-accessible resource, the system comprising:
   a user history database configured to maintain, for a plurality of authenticated users, data reflecting historical voice call characteristics indicative of each of the authenticated users;
   a user accounts database configured to maintain a communication number of a verification device associated with a user;
   a behavioral monitoring module configured to monitor one or more voice call characteristics during a voice call session, the monitored one or more voice call characteristics including timing data related to the voice call session; and
   a user authentication module configured to:
      receive a request by the user to access a computer-accessible resource;
      utilize the communication number to establish the voice call session with the user's verification device in order to send a request that the user perform a verification action;
      determine whether the user successfully performed the requested verification action;
      determine whether an authentication rule has been satisfied by:
         identifying the authenticated user that the user purports to be,
         comparing the monitored one or more voice call characteristics of the user to the maintained voice call characteristics of the authenticated user, and
         evaluating whether the monitored one or more voice call characteristics fall within ranges of the authenticated user's voice call characteristics; and
      if the verification action has been successfully completed by the user and if the authentication rule has been satisfied by the monitored voice call characteristics, generate an authentication response that indicates that the user has been authenticated for access to the computer-accessible resource.

18. The system of claim 17, wherein the user history database is further configured to save the monitored one or more voice call characteristics to the maintained voice call characteristics of authenticated users when the authentication rule has been satisfied.

19. The system of claim 17, wherein the requested verification action is performed by the user during the voice call session.

20. The system of claim 19, wherein the timing data relates to user actions during performance of the requested verification action.

* * * * *